Sept. 16, 1969   U. MAGRINI   3,466,927
APPARATUS FOR THE MEASUREMENT OF LOW VELOCITIES OF FLOW
OF LIQUIDS WITH WEAK ELECTRICAL CONDUCTANCE
Filed July 13, 1966   2 Sheets-Sheet 2

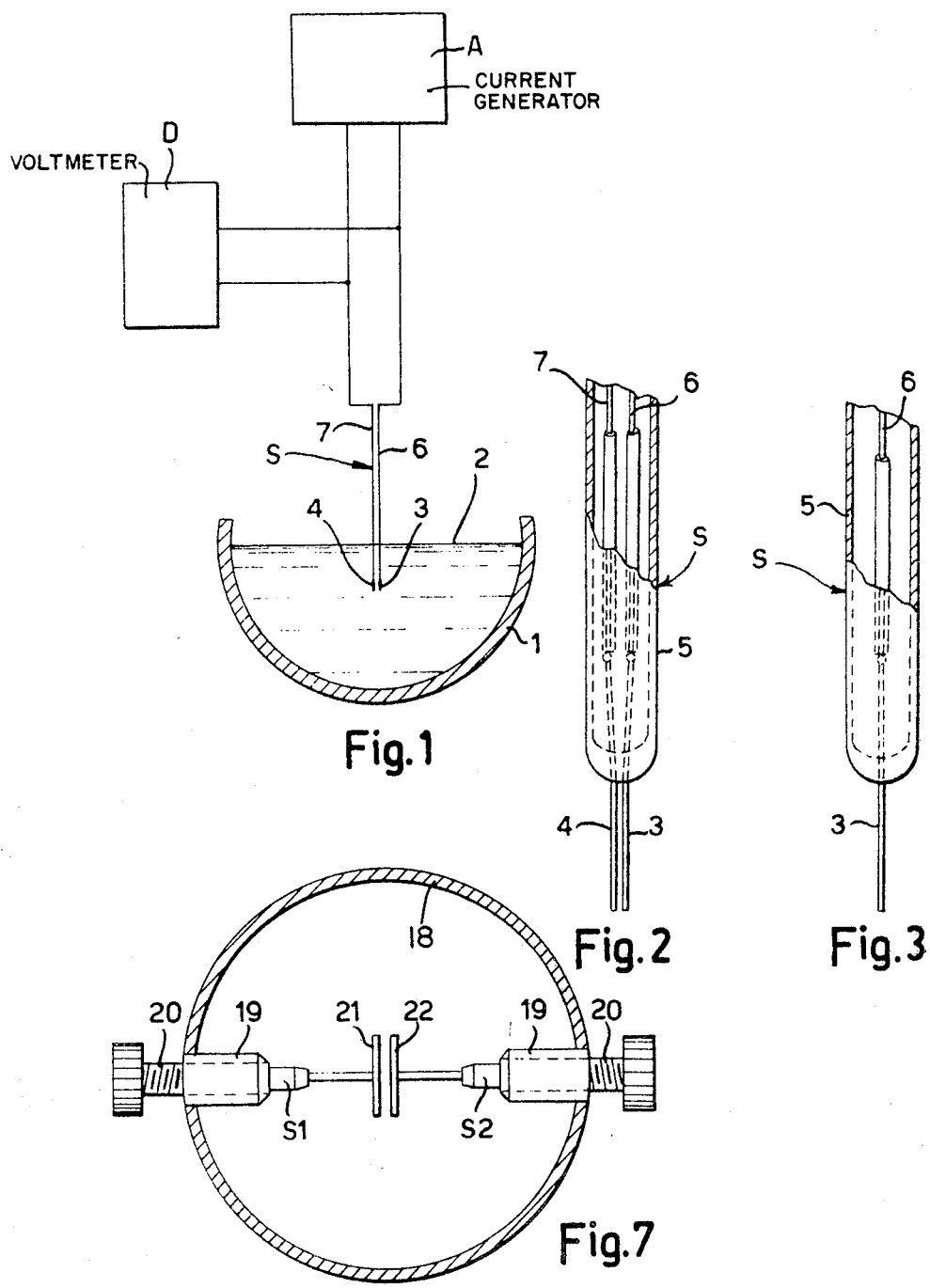

United States Patent Office 3,466,927
Patented Sept. 16, 1969

3,466,927
APPARATUS FOR THE MEASUREMENT OF LOW VELOCITIES OF FLOW OF LIQUIDS WITH WEAK ELECTRICAL CONDUCTANCE
Ugo Magrini, 38 Via Dodecaneso, Genoa, Italy
Filed July 13, 1966, Ser. No. 565,006
Claims priority, application Italy, July 19, 1965,
16,920/65; Sept. 29, 1965, 22,160/65
Int. Cl. G01f 1/00
U.S. Cl. 73—194           1 Claim

ABSTRACT OF THE DISCLOSURE

A flowmeter for measuring the velocity of a flowing liquid including a pair of electrodes spaced from each other in such liquid. A direct current generator is connected to the electrodes and a voltmeter is also attached to the electrodes for measuring the resistance of the liquid moving past the two electrodes which is indicative of the velocity.

---

This invention relates to improvements in the methods and means for the measurement of low velocities of flow in non-stagnant liquids with weak electrical conductance, such as, tap water or the like, by measuring the apparent variation of electrical resistance of the liquid moving between a pair of electrodes dipped in such liquid and connected to suitable measuring instruments, the whole device usually being called a "flowmeter."

The flowmeter according to the invention is adapted to measure not only velocities of flow (usually in the range of 0.5 to 3 mm./sec., but not over 300 mm./sec.) of quietly flowing liquids, but any status of agitation or of disturbance in a liquid which promotes a local movement of the liquid between the pair of electrodes having parallel axes; thus, as the electrical resistance between the electrodes of the flowmeter is maximum for a direction of flow at right angles to the plane passing through the axes of the electrodes, the probe will be adapted to indicate also the exact direction of the flow in the liquid.

The improved flowmeter according to the invention comprises a probe composed of a pair of exactly spaced electrodes fastened to an insulating supporting member. The electrodes are made of corrosion-resistant metal, such as platinum, and have such a size and shape (for example, a filiform or plate shape) as not to substantially influence the movements in the liquid.

The electrodes project by a suitable length and with a suitable separation (usually in the order of less than 1 mm., and preferably of about 0.5 mm.) from said insulating supporting member; means being provided for connecting the electrodes to a measuring instrument or circuit for measuring the apparent electrical resistance of the moving liquid between the electrodes. The measurement of the electrical resistance may be effected either by measurement of the applied voltage, if operated at constant current, or by measuring the current, whenever operating at constant voltage, or also by inserting the probe in a branch of a Wheatstone bridge.

The invention will be better understood from the following specification, in which reference is made to the accompanying drawings, in which:

FIGURE 1 shows diagrammatically a flowmeter arrangement comprising a probe whose electrodes are dipped in a liquid flowing in an open channel;

FIGURES 2 and 3 show substantially at natural scale two views at 90° of part of a probe provided with two filiform electrodes;

FIGURE 7 shows an embodiment of flowmeter probe according to the invention, provided with two facing electrodes mounted adjustably in a tubular supporting member.

Figure 4:
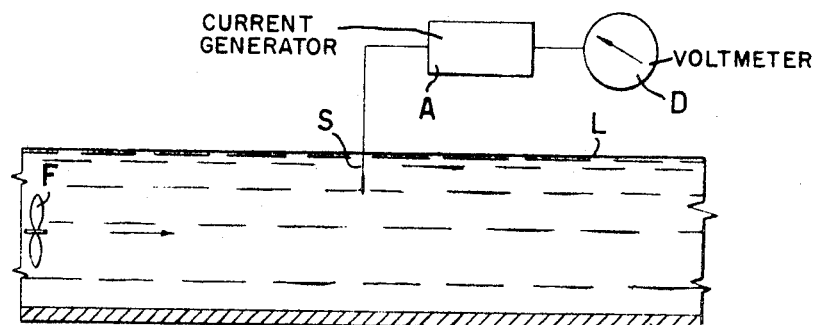
FIGURE 4 shows diagrammatically the arrangement of a flowmeter provides with a probe dipped in a channel.

With reference to FIGURE 1 of the drawings, 1 denotes a channel (in cross section) in which a liquid 2 having a weak electrical conductance flows, and whose velocity of flow is desired to be measured in a predetermined location of the channel. For this purpose, a probe (FIGURES 2 and 3) indicated by the reference letter S, and substantially comprising a pair of parallel electrodes 3 and 4 made of a suitable metal (for example platinum) mounted upon a suitable insulating supporting member, of example a small glass tube 5, is dipped into the liquid flowing through channel 1. The shape, dimensions and distance between the electrodes may vary according to requirements. In the case as shown in FIGURES 2 and 3 the parallel electrodes are filiform with a diameter 0.5 mm., a length of 15 mm. and are spaced apart by 0.5 mm. Of course, the above referred to dimensions are given merely by way of example, as they can vary according to requirements. With a probe of the type as described, it is possible to effect a measurement of the velocity of flow in a predetermined point of the flow of the moving liquid by dipping the probe with its electrodes arranged so that their separation is maximum in the direction of the flow to be measured. By increasing the separation of the electrodes, the velocity indicated by the instrument is an average value of the laminar velocities in the section of liquid encompassed by said electrodes. The direction of the flow will be that at right angles to the plane of separation between the electrodes. Thus it will be possible to exactly determine the direction of the disturbance in non-linear flows.

Suitably electrically insulated leads 6 and 7 connect the inside ends of the electrodes at the interior of the glass tube 5 with the negative and positive poles, respectively, of a direct current generator preferably at constant intensity of known construction, indicated by the box A. D denotes an instrument which detects the variations of potential as a function of the variations of the apparent resistance of the liquid 2 moving between the electrodes 3 and 4 and which are due to the variations of the velocity of the liquid 2. In practice an electronic integrating voltmeter, such as that known under the trade name of Solartron (constructed by the British company Solartron of Farnborough, Hants) may be used.

Of course, the values thus recorded are a function both of the velocity of the liquid and of the ionic concentration of the electrolyte under consideration.

In FIGURE 4, 8 denotes a channel-shaped duct in which a liquid flows having unknown electrical characteristics and the velocity of flow of which is to be measured. S denotes the measuring probe, for example. The probe which has been shown in FIGURES 2 and 3, while A denotes a constant-current generator and D the voltmeter or other instrument which indicates or records the variations of the electrical resistance measured between the electrodes of probe S.

The screw propeller F, immersed in the liquid contained in the channel 8 serves for generating the movement of the liquid. Of course, the described arrangement might well be employed in any duct whatsoever, or even in a river.

For a given velocity of flow of the liquid L in the channel 8, the flowmeter will indicate a determined value of voltage as a function of the resistance to the flow of the current between the electrodes of probe S. Whenever it is desired to deduce from such value the velocity of flow, the procedure below is followed.

Figure 5:
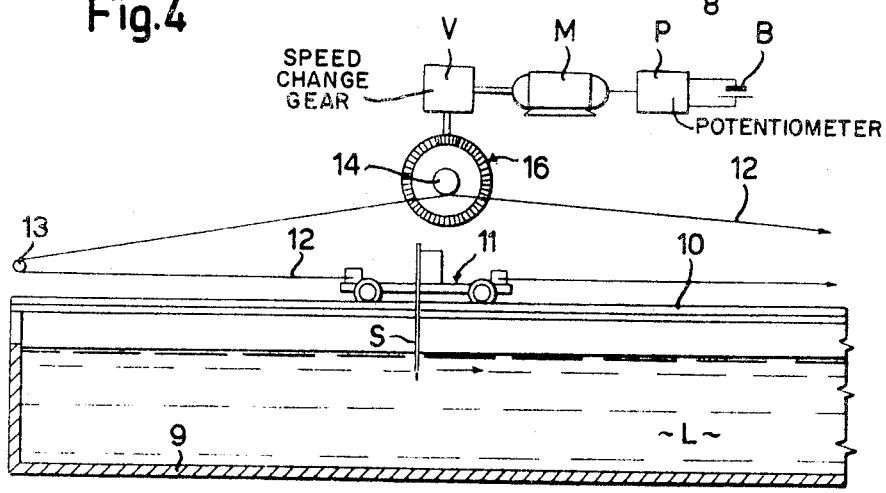
FIGURE 5 shows diagrammatically the arrangement of a flowmeter including a probe mounted on a carriage rolling on rails upon a tank containing the liquid whose electrical resistance should be tested at the required velocities of flow.

A certain amount of the liquid L under examination is transferred into a tank of the kind of that which has been indicated by 9 in FIGURE 5.

Above such tank, rails 10 are mounted, on which a carriage 11 is guided. A towing cord 12 anchored to one end of the truck 11 is led parallel to rails 10 to an idle pulley 13 mounted at one end of tank 9. From pulley 13, the cord 12 is led to a driving pulley 14 and from this to a second idle pulley (not shown) mounted at the opposite end of tank 9. From the second idle pulley the towing cord returns parallel to rails 10 again to carriage 11, to which it is fastened by its opposite end. The driving pulley 14 is driven through a gear drive 16 and a change speed gear V by a direct current motor M which is fed by a current source B provided for this purpose, with the interposition of a suitable resistor P. In this manner it is possible to vary within wide limits the translation speed of carriage 11 by acting both on the resistor P and on the change speed gear V. Upon carriage 11 a probe S is mounted, which is identical to that shown in FIGURE 4 and is connected to a measuring unit of the kind as shown in FIGURE 4 and which comprises a current feed unit A and a measuring and recording unit D (not shown in FIGURE 5).

This done, motor M is started and carriage 11, which carries the probe S dipping into the still liquid L, is towed. The towing speed is varied by acting on change speed gear V and/or potentiometer P until the measuring instrument D connected to probe S indicates that the resistance value between the electrodes of the probe is equal to that which had been predetermined within the same liquid while moving in the course of the measurement as described with reference to FIGURE 4. Due to the fact that the velocity of translation of carriage 11 is known, the velocity at which the two resistance values at the instrument D are equal is the velocity of flow of the liquid L within duct 8 in the position where it has been measured.

In the manner as above described it is, of course, possible to calibrate the instrument D so as to indicate the velocity values for any determined electrolyte.

Figure 6:
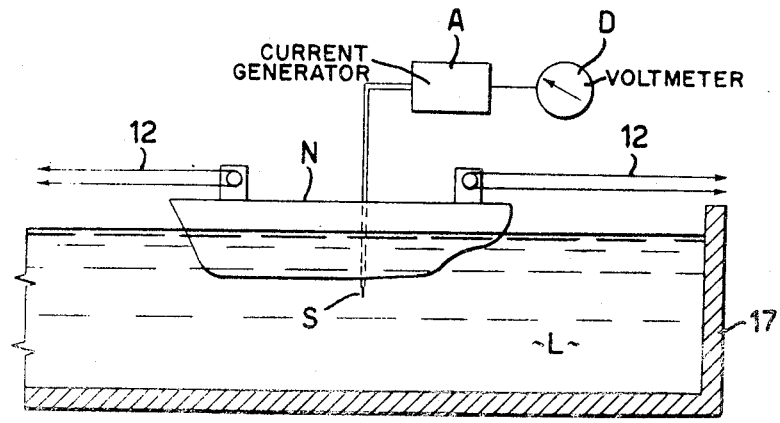
FIGURE 6 shows diagrammatically the arrangement of a flowmeter according to the invention arranged in a suitable location of a model ship moved in a tank.

In FIGURE 6 there is shown a further employment of the probe S according to the invention for the measurement of the components of velocity in a determined location of the hull of a ship's model.

The ship's model N is towed in a tank or basin 17 which is similar to tank 9 shown in FIGURE 5, in a manner which is per se conventional in experiments of this kind, by means of a towing device which is substantially of the type as described for the towing of carriage 11.

Probe S is mounted in the desired location of the hull of the ship's model under examination. In this manner it is possible to determine the velocity of flow of the liquid in a determined point of the hull.

In FIGURE 7, there is shown a modification of the probe according to the invention for the measurement of the velocity of flow of a liquid within a pipe.

In this case, it is preferred to use parallel plate-like electrodes 21 and 22 and to mount each of them on a probe section S1–S2. These two probe sections are fastened onto a tubular member or sleeve 18 to be inserted between two pipe sections having a flow area which is equal to that of said sleeve 18. The parallel plates of said electrodes 21–22 are disposed parallel to the direction of flow in the tubular member or sleeve 18.

If an adjustment of the electrodes 21, 22 is desired, the probe sections S1–S2 may be externally screw-threaded and screwed into supporting tubular members 19 projecting into sleeve 18.

The operation of the probe as described is identical to that which has been described with reference to the preceding figures.

I claim:
1. A flowmeter for the measurement of low velocities of flow of liquids with weak electrical conductance, said flowmeter comprising a pair of spaced, parallel electrodes adapted for immersion into the liquid whose flow velocity is to be measured, support means for holding said electrodes in insulated relation in which the electrodes are spaced apart in a plane perpendicular to the direction of flow of the liquid, said electrodes and the support means being sufficiently thin, in the direction of flow so as not to substantially disturb the liquid flow to be measured while being sufficiently thick as to resist deformation under the influence of the liquid under agitation, said electrodes being filiform and having a diameter of about 0.5 mm. and a spacing of the same order, said parallel electrodes and support means cooperatively constituting a probe; a constant voltage, direct-current generator connected to said electrodes and means connected to said electrodes for measuring the variations of the electrical resistance of the liquid between said electrodes which is indicative of the velocity of flow of the liquid.

References Cited

UNITED STATES PATENTS

| | | | |
|---|---|---|---|
| 2,843,823 | 7/1958 | Bayless | 324—30 |
| 2,876,414 | 3/1959 | Shaheen | 324—30 |
| 3,374,672 | 3/1968 | Horne | 73—194 |
| 1,388,613 | 8/1921 | Simsohn | 324—30 XR |
| 1,411,796 | 4/1922 | Meyer | 73—194 |
| 2,611,268 | 9/1952 | Mellen | 73—194 |
| 2,820,945 | 1/1958 | Marsden | 324—65 XR |
| 3,148,541 | 9/1964 | Higgins | 73—194 |
| 3,242,729 | 3/1966 | Keller | 73—194 |

CHARLES A. RUEHL, Primary Examiner

U.S. Cl. X.R.

324—30